Grier & Boyd,
Scissors.
Nº 56,928. Patented Aug. 7, 1866.
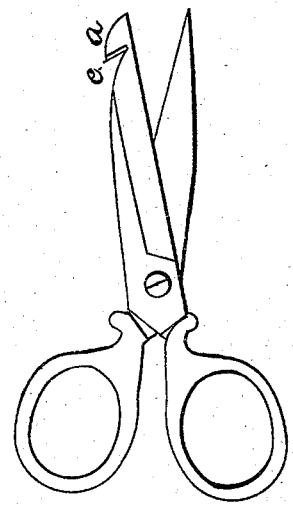
Witnesses:
O.T.Dodge
[illegible]
Inventors:
Y. N. Grier &
R. H. Boyd
By W. C. Dodge
Attys.

UNITED STATES PATENT OFFICE.

W. W. GRIER AND R. H. BOYD, OF HULTON, PENNSYLVANIA.

IMPROVEMENT IN SCISSORS.

Specification forming part of Letters Patent No. 56,928, dated August 7, 1866.

*To all whom it may concern:*

Be it known that we, W. W. GRIER and R. H. BOYD, of Hulton, in the county of Allegheny and State of Pennsylvania, have invented certain new and useful Improvements in Shears; and we do hereby declare that the following is a full, clear, and exact description thereof, reference being had to the accompanying drawing, making part of this specification, and to the letters of reference marked thereon, like letters indicating like parts wherever they occur.

To enable others skilled in the art to construct and use the invention, we will proceed to describe it.

Our invention consists in forming one or both of the blades of a pair of shears or scissors with a peculiarly-formed cutting-hook for ripping seams of cloth and similar purposes.

The accompanying drawing represents an ordinary pair of scissors with our improvement applied.

It frequently happens that it is necessary to rip seams in garments, and when this is done in the ordinary manner a knife is generally used. Experience has shown that in using a knife or any similar cutting-instrument it is very difficult to perform the operation without cutting the cloth. Besides a knife is not always at hand, and even when it is the process is slow and tedious, but two or three stitches being cut at a time. To remedy these difficulties, and to obviate entirely the use of a separate instrument for this purpose, we construct one or both of the blades with a hook, as shown at *a*. This hook has its edge inclined, as shown, and is beveled on each side to a sharp cutting-edge at the center, this cutting-edge being represented at *e*. The lower edge of the notch is also made sharp for a greater or less distance from its union with the edge *e*, thus forming two cutting-edges united at an angle more or less acute. Instead of being V-shaped, as represented, the hook may be curved where the two cutting-edges unite so as to form a curved or circular cutting-edge.

In order to prevent the instrument from cutting the cloth the hook *a*, in rear of the cutting-edge, or on that side next to the point of the blade, should be of considerable thickness, and the bevel of the cutting-edge should be more abrupt than an ordinary knife-blade. Then when the end of the cloth to be ripped is fastened to the table or knee, so that the cloth can be drawn taut, and the hook is inserted in the seam, and the scissors drawn along the seam, the thick portion of the hook will press the cloth asunder, and the pressure on each side will tend to keep the cutting-edge *e* from deflecting to one or the other side and cut the cloth.

If found necessary, a deflecting-lip may be extended outward on each side of the hook.

By forming the point of the hook *a* in line with or slightly below the outer edge of the blade, and rounding the point of the hook or curving its outer point slightly inward, it is prevented from catching in obstacles when in use as an ordinary shears. To use it, it is only necessary to insert the hook in the seam and draw it along in either direction.

By this improvement we provide a most perfect ripping-instrument in combination with the shears or scissors, to which it adds no weight, but a trifle in expense, and that does not in any manner interfere with the ordinary uses of the shears, while it obviates the necessity of providing any separate instrument for the purpose of ripping, and does not even necessitate the laying down of the shears in order to convert them from a cutting to a ripping instrument.

Having thus described our invention, what we claim is—

Providing shears or scissors with the ripping-hook *a*, substantially as and for the purpose set forth.

WILLIAM W. GRIER.
ROBERT H. BOYD.

Witnesses:
JAMES M. TAYLOR,
ISAAC REESE.